United States Patent
Peng et al.

(10) Patent No.: US 9,077,143 B2
(45) Date of Patent: Jul. 7, 2015

(54) SHORTER WAVELENGTH PHOTO-ANNEALING APPARATUS FOR RARE-EARTH-DOPED FIBER AND ITS OPTICAL ASSEMBLIES UNDER IRRADIATION

(71) Applicant: National Applied Research Laboratories, Taipei (TW)

(72) Inventors: Tz-Shiuan Peng, Taipei (TW); Ren-Young Liu, Hsinchu (TW); Lon Wang, Taipei (TW)

(73) Assignee: NATIONAL APPLIED RESEARCH LABORATORIES (TW)

( * ) Notice: Subject to any disclaimer, the term of this patent is extended or adjusted under 35 U.S.C. 154(b) by 8 days.

(21) Appl. No.: 13/937,786

(22) Filed: Jul. 9, 2013

(65) Prior Publication Data

US 2013/0293948 A1   Nov. 7, 2013

Related U.S. Application Data

(62) Division of application No. 12/897,059, filed on Oct. 4, 2010, now Pat. No. 8,578,739.

(51) Int. Cl.
*H01S 3/067* (2006.01)
*H01S 3/094* (2006.01)
*H01S 3/16* (2006.01)

(52) U.S. Cl.
CPC ....... *H01S 3/06754* (2013.01); *H01S 3/094003* (2013.01); *H01S 3/067* (2013.01); *H01S 3/094023* (2013.01); *H01S 3/1608* (2013.01)

(58) Field of Classification Search
CPC ... H01S 3/067; H01S 3/06754; H01S 3/1608; H01S 3/094003
USPC .................................... 359/341.1, 341.3
See application file for complete search history.

(56) References Cited

U.S. PATENT DOCUMENTS

| | | | | |
|---|---|---|---|---|
| 5,136,420 A | * | 8/1992 | Inagaki et al. | 359/341.3 |
| 6,452,717 B1 | * | 9/2002 | Endo | 359/337 |
| 6,975,447 B2 | * | 12/2005 | Kinoshita | 359/337.4 |
| 2006/0248925 A1 | * | 11/2006 | Sanders et al. | 65/392 |

OTHER PUBLICATIONS

Peng et al. "Photo-annealing Effects for Erbium Doped Fiber Sources after Gamma Irradiation Tests by Using 532 nm and 976 nm Lasers", Proceedings of the SPIE, 20th International Conference on Optical Fibre Sensors, Oct. 5, 2009.*

* cited by examiner

*Primary Examiner* — Eric Bolda
(74) *Attorney, Agent, or Firm* — Volpe and Koenig, P.C.

(57) ABSTRACT

An optical fiber apparatus is suitable to operate under irradiation, more particularly to mitigating the damage of a rare-earth-doped optical fiber element as part of an optical fiber assembly causes by irradiation. The irradiation mitigation attributes to a photo-annealing apparatus including at least a shorter wavelength photo-annealing spectral content, which is relative to that of a pump light source, for effectively photo-annealing the rare-earth-doped fiber element. Photo-annealing by such shorter wavelength light results in a fast and nearly complete recovery of radiation induced attenuation of the rare-earth-doped optical fiber element in the wavelength range from 900 nm to 1700 nm.

7 Claims, 6 Drawing Sheets

SHORTER WAVELENGTH PHOTO-ANNEALING APPARATUS FOR RARE-EARTH-DOPED FIBER AND ITS OPTICAL ASSEMBLIES UNDER IRRADIATION

CROSS REFERENCE TO RELATED APPLICATION(S)

This application is a divisional of U.S. patent application Ser. No. 12/897,059, which was filed Oct. 4, 2010, and is incorporated herein by reference as if fully set forth.

FIELD OF THE INVENTION

The invention relates to an optical fiber assembly suitable to operate under irradiation environment. More particularly this invention is to mitigate the radiation damage of a rare-earth-doped optical fiber element as part of the optical fiber assembly. The mitigation of radiation damage attributes to a photo-annealing apparatus in which the wavelength range of the photo-annealing light source is less than or equal to the wavelength of the pump light source for the rare-earth-doped fiber.

BACKGROUND OF THE INVENTION

Space technology plays an increasingly important role in our daily life. However, spacecraft is typically hard or expensive to reach for service after launch. Therefore, components, sub-assemblies and systems for space applications require special design and rigorous test in order to perform over space environment, especially irradiation.

Due to the advantages of light weight, compact size, broad bandwidth, and resistance of electromagnetic interference, fiber optics systems and assemblies have been developed and employed for space and nuclear facilities applications including communication, sensing, navigations and etc. However, it has been known that the performance of an optical-fiber-based device would be severely degraded by the RIA (Radiation Induced Attenuation). The RIA could cause severe output power loss of the optical-fiber-based device, and hence greatly limits its operating life. To decrease RIA, an effective method needs to be developed.

In the prior art, some methods have been reported to reduce the RIA in passive single-mode fibers (no rare-earth dopant) through thermal annealing (U.S. Pat. No. 4,229,069), and hydrogen pre-loading approaches (U.S. Pat. No. 6,130,981). However, the thermal annealing approach needs to raise temperature up to 200° C. to 300° C. to decrease RIA effectively. Such a high temperature environment could damage or degrade the device and its associate assembly. On the other hand, the hydrogen pre-loading method needs a hermetic coating to avoid out-diffusion of hydrogen, and the fabrication process of a hermetic coating might be complicated and expensive.

In addition, prior to the present invention, photo-annealing method had been reported, with a limited success, to reduce the RIA in both passive single-mode fibers such as a pure-core fiber and a Ge-doped fiber (U.S. Pat. No. 4,232,228), and an active Er-doped fiber. Moreover, the prior photo-annealing approach for active Er-doped fiber employed only 980-nm light source.

According to the present invention, applicants have departed from the conventional wisdom, and had conceived and implemented a photo-annealing apparatus to include at least a shorter wavelength photo-annealing spectral content, which is relative to that of a pump light source, for effectively photo-annealing the rare-earth-doped fiber element. The photo-annealing by shorter wavelength light results in a fast and nearly complete recovery of RIA of the rare-earth-doped optical fiber element in the wavelength range from 900 nm to 1700 nm. Such a fast and nearly complete RIA recovery is unprecedented in open literature. The invention is briefly described as follows.

SUMMARY OF THE INVENTION

To resolve the problems of RIA associated with an optical fiber assembly consists of at least a rare-earth-doped fiber element effectively, the present invention provides a new and useful photo-annealing apparatus configured to achieve a fast and nearly complete recovery of RIA.

The photo-annealing apparatus of the present invention consists of an optical fiber assembly and a photo-annealing light source. The optical fiber assembly, including a rare-earth-doped optical fiber device which is connected to the photo-annealing light source. Preferably, the wavelength range of the photo-annealing light is less than or equal to the wavelength of exciting rare-earth elements such as Erbium or Ytterbium. When the light from the photo-annealing source is coupled to the optical fiber assembly, it can recover the RIA of the rare-earth-doped optical fiber more than 50%, preferably at least 75%, and most preferably at least 99% in the wavelength range from 900 nm to 1700 nm. Relative to the conventional photo-annealing method, the present invention of employing a relatively shorter photo-annealing wavelength, as compared to the wavelength for exciting the rare-earth-doped fiber element, provides a nearly complete RIA recovery from 900 nm to 1700 nm range, and at least a two order of magnitude improvement in RIA recovering time. Such a fast and nearly complete RIA recovery makes the invented apparatus extremely suitable for space and nuclear facilities applications including communication, sensing, navigations and etc.

In accordance with one aspect of the present invention, an optical fiber assembly is provided. The optical fiber assembly is connected to a photo-annealing light source, and including at least a rare-earth-doped fiber element and having a first port and a second port, wherein the first port and the second port can be an input, output or an unused port. The photo-annealing light source is coupled to the optical fiber assembly to recover the RIA.

Preferably, the photo-annealing light source is a laser or a broadband light source.

Preferably, the wavelength range of the photo-annealing light source is less than or equal to the wavelength for exciting rare-earth-doped fiber element in the optical fiber assembly.

Preferably, the recoverable RIA covers all of the spectral range from 900 nm to 1700 nm. And the photo-annealing apparatus recovers more than 50%, preferably at least 75%, and most preferably at least 99% of RIA arising from rare-earth-doped fiber element.

Preferably, the photo-annealing light source operates continuously or intermittently.

In accordance with further aspect of the present invention, an optical fiber assembly is provided. The optical fiber assembly includes a light source coupled to an optical fiber assembly including at least a rare-earth-doped fiber element. The light source photo-anneals the radiation induced defects of the rare-earth-doped fibers and pumps the rare-earth-doped fiber device simultaneously.

Preferably, the light source is a laser or a broadband light source.

Preferably, the light source is a photo-annealing light source and further is a pump light source for exciting rare-earth elements.

Preferably, the light source recovers the RIA of the rare-earth-doped fiber and pumps the rare-earth-doped fiber simultaneously.

Preferably, the wavelength range of the light source is less than the longest wavelength which is able to excite the rare-earth ions in the optical fiber assembly.

Preferably, the recoverable RIA covers all of the spectral range from 900 nm to 1700 nm. And the photo-annealing apparatus recovers more than 50%, preferably at least 75%, and most preferably at least 99% of RIA arising from rare-earth-doped fiber element.

In accordance with one aspect of the present invention, a photo-annealing method is provided. The photo-annealing method includes the steps of providing a photo-annealing light source and an optical fiber assembly including at least a rare-earth-doped fiber; transmitting the light from the photo-annealing light source to the optical fiber assembly; and recovering RIA of the rare-earth-doped fiber by the photo-annealing light source.

The above aspects and advantages of the present invention will become more readily apparent to those ordinarily skilled in the art after reviewing the following detailed descriptions and accompanying drawings, in which:

BRIEF DESCRIPTION OF THE DRAWINGS

A schematic diagram of a general optical fiber apparatus is shown in FIG. 1;

FIGS. 2A and 2B is a first and a second preferred implementation case schematic diagram of the optical fiber apparatus, respectively, wherein FIG. 2A is a single-pass backward configuration and FIG. 2B is a double-pass backward configuration;

FIGS. 3A and 3B is a third and a forth preferred implementation case schematic diagram of the optical fiber apparatus, respectively, wherein FIG. 3A is a single-pass backward configuration and FIG. 3B is a double-pass backward configuration;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only it is not intended to be exhaustive or to be limited to the precise form disclosed.

Figure 1:
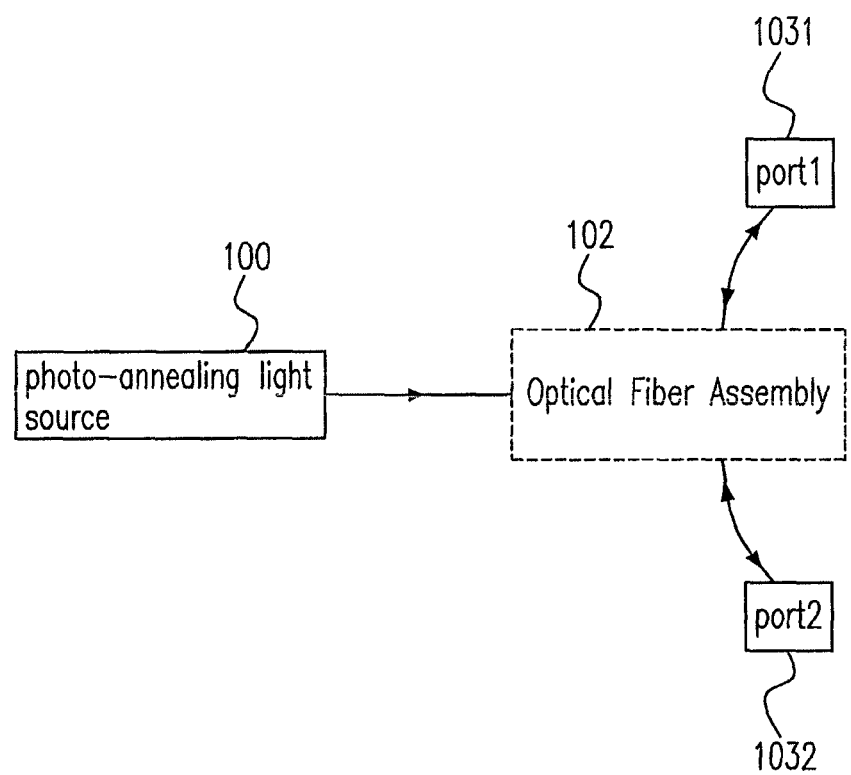

Please refer to FIG. 1, which is a general schematic diagram of the optical fiber apparatus showing an optical fiber assembly connected to a photo-annealing light source. The optical fiber apparatus, as described in FIG. 1, includes a photo-annealing light source 100 coupled to an optical fiber assembly 102. The optical fiber assembly 102 includes at least a rare-earth-doped fiber. Preferably, the optical fiber assembly 102 includes WDMs (Wavelength Division Multiplexings), pump lasers for exciting rare-earth-doped fibers, optical isolators, plural optical fibers and having a first port 1031 and a second port 1032, wherein the first port 1031 and the second port 1032 can be an output port, an input port or an unused port. It has been known that the performance of a rare-earth-doped fiber device would be severely degraded by RIA. The RIA includes optical absorption bands of the corresponding radiation induced defect which can be diminished by a photo-annealing light. The photo-annealing light source 100, which can be a laser or a broadband light source, generates a light incident into the rare-earth-doped fiber of the optical fiber assembly 102 to reduce the RIA. Preferably, the wavelength of the photo-annealing light is ranged from 355 nm to 980 nm, and the RIA at least from 900 nm to 1700 nm in wavelength can be efficiently recovered. Consequently, the performance of the optical fiber assembly 102 could be recovered by the photo-annealing light source 100.

Figure 2A:
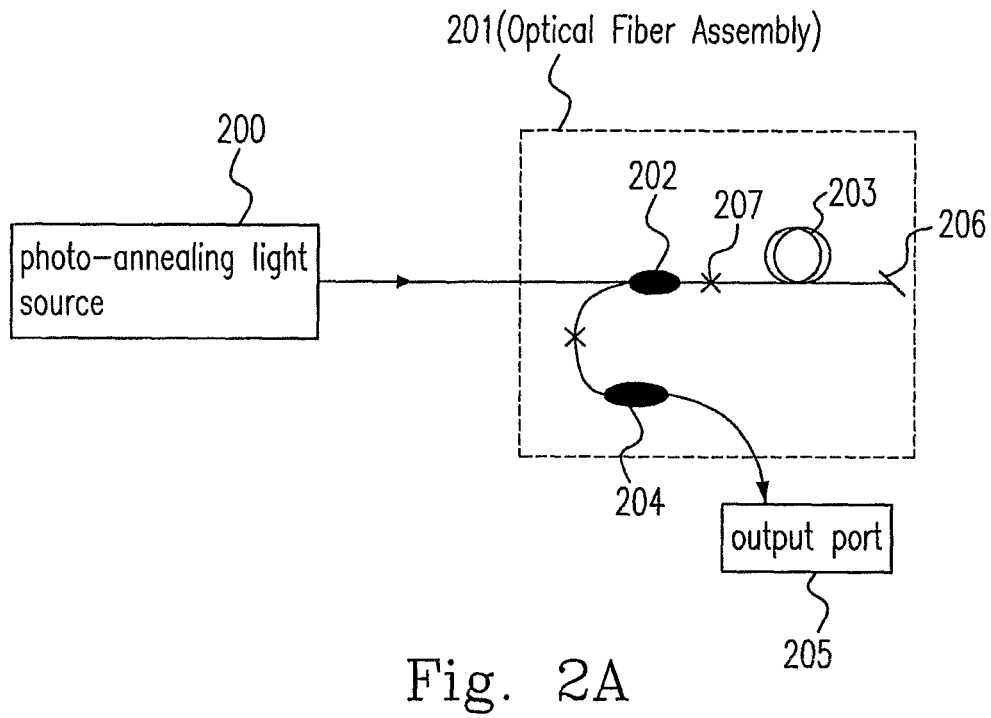

Please refer to FIG. 2A, which is a first preferred implementation case schematic diagram of the present invention, showing a photo-annealing light source 200 coupled to an optical fiber assembly 201. The optical fiber assembly 201 is used as a single-pass backward configuration, including a 3-port WDM 202 connected to an optical isolator 204 with an output port 205, a rare-earth-doped fiber 203 connected to the 3-port WDM 202 and a fiber termination 206, and a fiber splicing 207. Preferably, a rare-earth-doped fiber 203 is an EDF (Erbium Doped Fiber). The photo-annealing light source 200 is also an optical pump light source for exciting the rare-earth-doped fiber 203. When a light from the photo-annealing light source 200 is coupled to the optical fiber assembly 201, it can photo-anneal the radiation-induced defects of the rare-earth-doped fiber 203 and pump the rare-earth-doped fiber 203 simultaneously. In such an architecture, the transmitting direction of the output ASE (Amplified Spontaneous Emission) light is opposite to that of the pump light. The RIA of the rare-earth-doped fiber 203 could nearly be diminished in the wavelength range from 900 nm to 1700 nm by the photo-annealing light source 200.

Figure 2B:
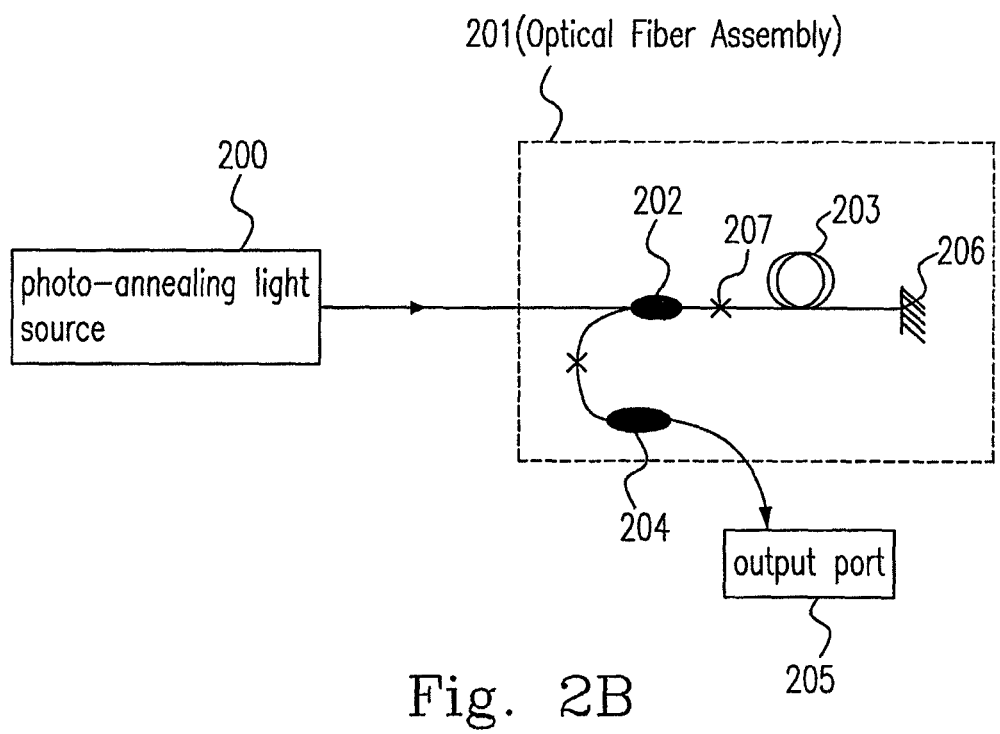

Please refer to FIG. 2B, which is a second preferred implementation case schematic diagram of the present invention, showing a photo-annealing light source 200 coupled to an optical fiber assembly 201. The optical fiber assembly 201 is used a double-pass backward configuration, including a 3-port WDM 202 connected to an optical isolator 204 with an output port 205, a rare-earth-doped fiber 203 connected to the 3-port WDM 202 and a reflector 206, and a fiber splicing 207. Preferably, a rare-earth-doped fiber 203 is an EDF. The photo-annealing light source 200 further acts as an optical pump light source for exciting the rare-earth-doped fiber 203. When a light from the photo-annealing light source 200 is coupled to the optical fiber assembly 201, the radiation-induced defects of the rare-earth-doped fiber 203 can be photo-annealed and the rare-earth-doped fiber 203 also can be pumped. In such an architecture, the forward ASE light of the rare-earth-doped fiber 203 excited by the photo-annealing light source 200 is reflected by the reflector 206, and re-amplified by the pumped rare-earth-doped fiber 203. The transmitting direction of the output ASE light is opposite to that of the pump light. The RIA of the rare-earth-doped fiber 203 could nearly be diminished in the wavelength range from 900 nm to 1700 nm by the photo-annealing light source 200.

Figure 3A:
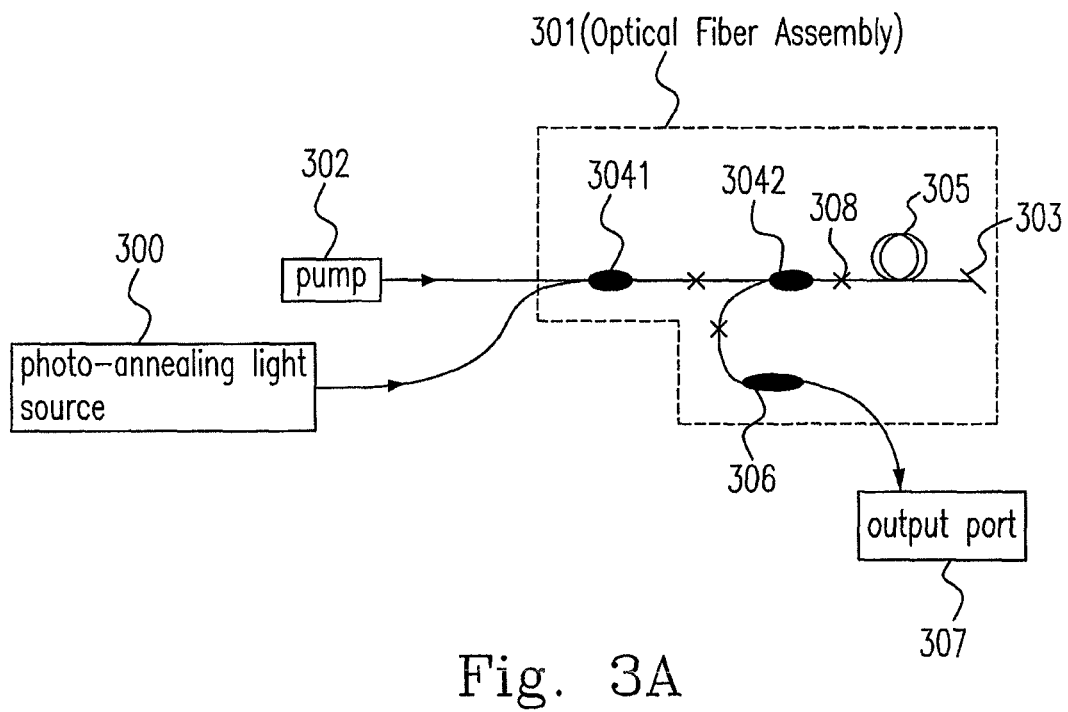

Please refer to FIG. 3A, which is a third preferred implementation case schematic diagram of the present invention, showing a photo-annealing light source 300 coupled to an optical fiber assembly 301. The optical fiber assembly 301 is used as a single-pass backward configuration, including a first 3-port WDM 3041 connected to a pump laser 302, a second 3-port WDM 3042 connected to an optical isolator 306 with an output port 307, a rare-earth-doped fiber 305 connected to the 3-port WDM 3042 and a fiber termination 303, and a fiber splicing 308. Preferably, a rare-earth-doped fiber 305 is an EDF. When a light from the photo-annealing light source 300 emits to the optical fiber assembly 301, it can recover the RIA of the rare-earth-doped fiber 305. The pump laser 302 is used to excite the rare-earth-doped fiber 305 for generating ASE light. Therein, the light from the photo-annealing light source 300 can operate continually or intermittently. In such an architecture, the transmitting direction of the output ASE light is opposite to that of the pump light. The RIA of the rare-earth-doped fiber 305 could nearly be diminished in the wavelength range from 900 nm to 1700 nm by the photo-annealing light source 300.

Figure 3B:
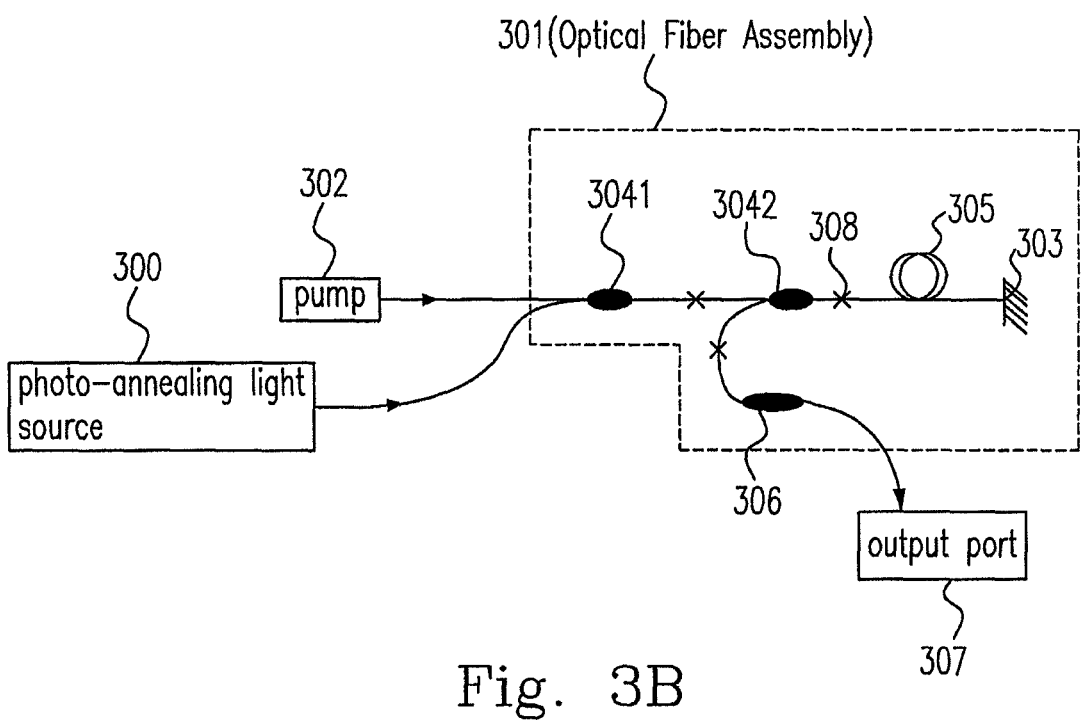

Please refer to FIG. 3B, which is a forth preferred implementation case schematic diagram of the present invention, showing a photo-annealing light source 300 coupled to an optical fiber assembly 301. The optical fiber assembly 301 is used as a double-pass backward configuration, including a first 3-port WDM 3041 connected to a pump laser 302, a second 3-port WDM 3042 connected to an optical isolator 306 with an output port 307, a rare-earth-doped fiber 305 connected to the 3-port WDM 3042 and a reflector 303, and a fiber splicing 308. Preferably, a rare-earth-doped fiber 305 is an EDF. When a light emitted from the photo-annealing light source 300 is coupled to the optical fiber assembly 301, it can recover the RIA of the rare-earth-doped fiber 305. The pump laser 302 is used to excite the rare-earth-doped fiber 305 for generating ASE light. Therein, the light from the photo-annealing light source 300 can operate continually or intermittently. In such an architecture, the forward ASE light of the doped fiber 305 excited by the photo-annealing light source 300 is reflected by the reflector 303, and re-amplified by the pumped rare-earth-doped fiber 305. The transmitting direction of the output ASE light is opposite to that of the pump light. The RIA of the rare-earth-doped fiber 305 could nearly be diminished in the wavelength range from 900 nm to 1700 nm by the photo-annealing light source 300.

Figure 4:
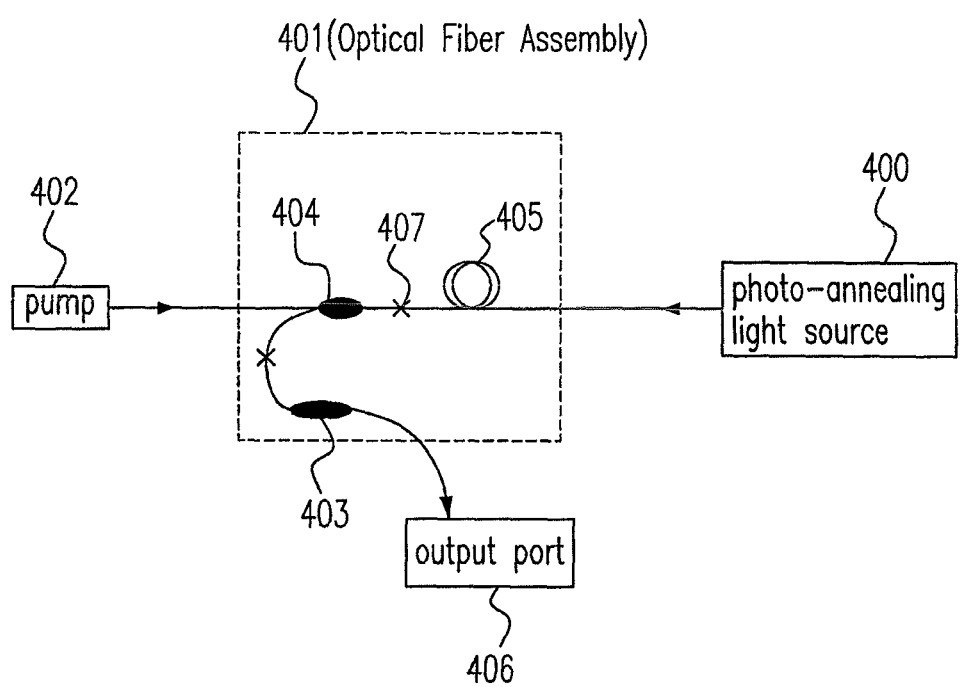
FIG. 4 is a fifth preferred implementation case schematic diagram of the optical fiber apparatus.

Please refer to FIG. 4, which is a fifth preferred implementation case schematic diagram of the present invention, showing a photo-annealing light source 400 coupled to an optical fiber assembly 401, including a 3-port WDM 404 connected to a pump laser 402, an optical isolator 403 with an output port 406, a rare-earth-doped fiber 405 connected to the photo-annealing light source 400, and a fiber splicing 407. Preferably, a rare-earth-doped fiber 405 is an EDF. When a light emitted from the photo-annealing light source 400 is coupled to the optical fiber assembly 401, it can recover the RIA of the rare-earth-doped fiber 405. The pump laser 402 is used to excite the rare-earth-doped fiber 405 for generating ASE light. Therein, the light from the photo-annealing light source 400 can operate continually or intermittently. In such an architecture, the transmitting direction of the output ASE light is opposite to that of the pump light. The RIA of the rare-earth-doped fiber 405 could nearly be diminished in the wavelength range from 900 nm to 1700 nm by the photo-annealing light source 400.

Figure 5:
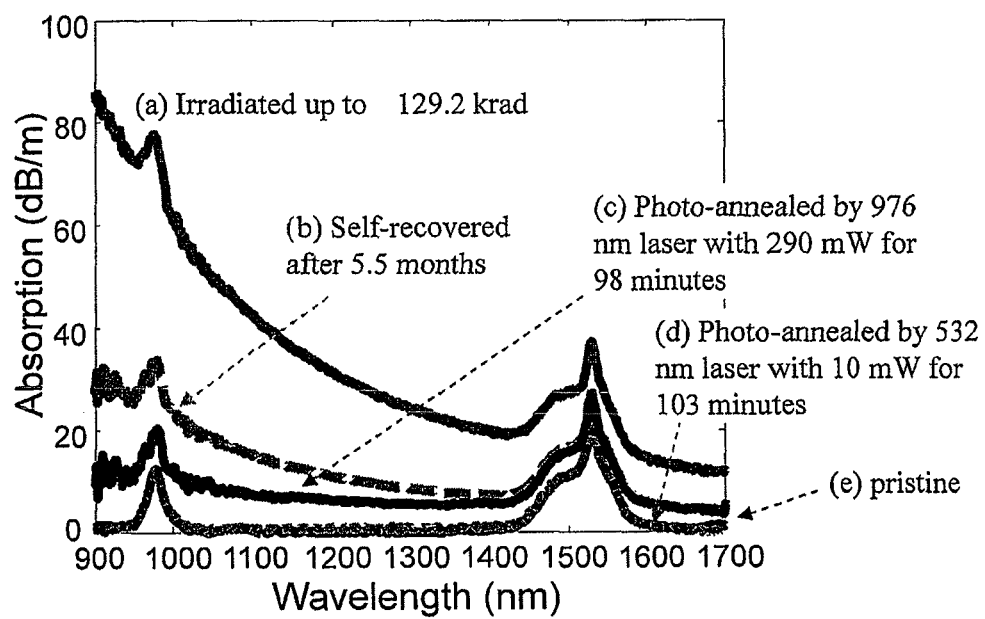
FIG. 5 is the absorption spectra of an Erbium-doped fiber employed in FIG. 4 configuration, and were measured when (a) irradiated up to 129.2 krad under $^{60}$Co irradiation, (b) self-recovered after 5.5 months at room temperature, (c) photo-annealed by 976-nm laser with 290 mW for 98 minutes, (d) photo-annealed by 532-nm laser with 10 mW for 103 minutes, and (e) was before $^{60}$Co irradiation.

Please refer to FIG. 5, which was measured under the configuration of FIG. 4. The absorption spectra of EDF show that the RIA could nearly be diminished in the wavelength range from 900 nm to 1700 nm by the photo-annealing of 532-nm laser. Wherein the absorption spectrum of (d) is measured under a 532-nm laser with 10 mW for 103 minutes, and the absorption spectrum of (e) is measured before $^{60}Co$ irradiation. As shown, these two measured curves are nearly coincident with each other means that the RIA of EDF is nearly recovered.

Figure 6:
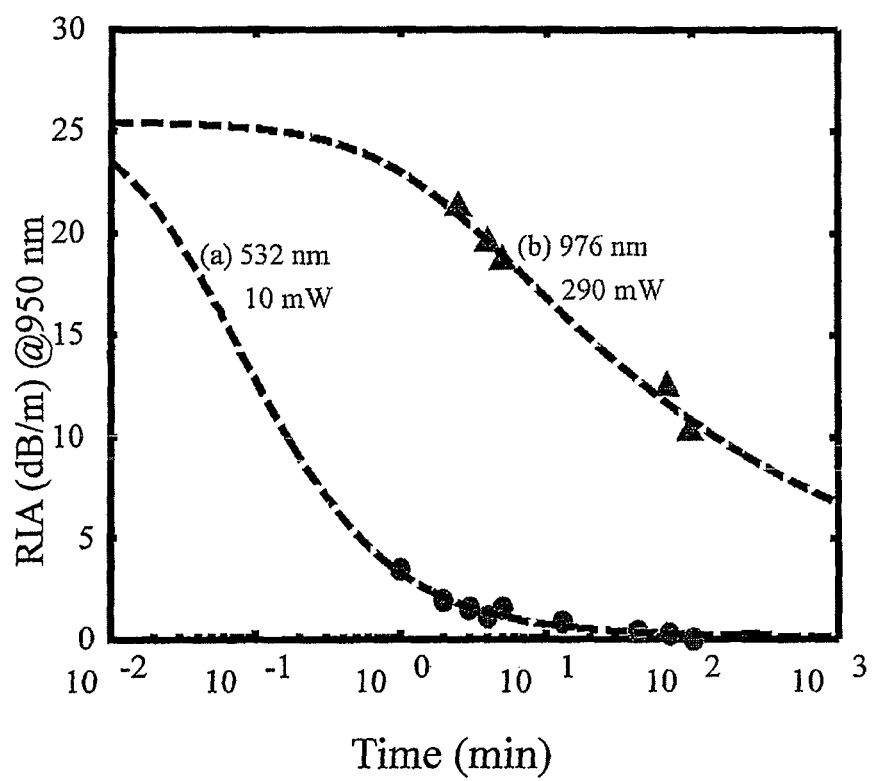
FIG. 6 shows that RIA of EDF at wavelength of 950 nm varied with time when photo-annealed by (a) a 532-nm laser with 10 mW and (b) a 976-nm laser with 290 mW.

Please refer to FIG. 6, the RIA recovering times by photo-annealing of the 532-nm and 976-nm lasers are compared. The photo-annealing effect of the 532-nm laser was pronounced. The needed times of half recovered RIA was found 5.6 seconds and 2679 seconds for the 532-nm using lower input power of 10 mW and 976-nm lasers using higher input power of 290 mW, respectively. This is two order of magnitude of difference in RIA recovering time. Therefore, the short wavelength laser of 532-nm showed excellent annealing rates on the EDF when compared with the longer wavelength laser of 976-nm.

In conclusion, by means of the photo-annealing light source, the optical fiber assembly can mitigate the degradation by the RIA of the rare-earth-doped fibers under the irradiation environment. The light emitted from the photo-annealing light source, especially for the wavelength of the light is less than the pump wavelength of exciting rare-earth elements, is able to recover the RIA in fast annealing rates so that the optical fiber assembly can maintain its performance as if operating in a non-radiation environment. Therefore, the photo-annealing apparatus of the present invention is particularly suitable for operating at the irradiation environments, such as space, nuclear power plant facilities and etc.

Based on the above descriptions, it is understood that the present invention is indeed an industrially applicable, novel and obvious one with values in industrial development. While the invention has been described in terms of what are presently considered to be the most practical and preferred embodiments, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. An optical fiber apparatus, comprising:
   an optical fiber assembly including at least a rare-earth-doped fiber element; and
   a light source, coupled to the optical fiber assembly, emits a light to recover a radiation induced attenuation and pumps the optical fiber assembly simultaneously.

2. The optical fiber apparatus as claimed in claim 1, wherein the light source is a photo-annealing light source.

3. The optical fiber apparatus as claimed in claim 1, wherein the light source further is an optical amplifying light source for exciting rare-earth-doped fiber elements.

4. The optical fiber apparatus as claimed in claim 1, wherein the light source is either a laser or a broadband light source.

5. The optical fiber apparatus as claimed in claim 1, wherein the wavelength range of the light source is less than the wavelength of excited rare-earth-doped fiber elements.

6. The optical fiber apparatus as claimed in claim 1, wherein the light source which serves as a photo-annealing and pump light source at the same time recovers more than 50%, preferably at least 75%, and most preferably at least 99% of RIA in any wavelength interval from 900 nm to 1700 nm.

7. An optical fiber apparatus, comprising:
an optical fiber assembly including at least a rare-earth-doped fiber element;
a photo-annealing light source coupled to the optical fiber assembly and emitting a light to recover an optical loss induced by irradiation; and
a pump laser coupled to the optical fiber assembly and emitting a light to pump the rare-earth-doped fiber element,
wherein the optical fiber apparatus is able to recover more than 50%, preferably at least 75%, and most preferably at least 99% of RIA in any wavelength interval from 900 nm to 1700 nm.

* * * * *